US008180599B2

(12) United States Patent
Alicherry et al.

(10) Patent No.: US 8,180,599 B2
(45) Date of Patent: *May 15, 2012

(54) NETWORK DESIGN UTILIZING NETWORK MANAGEMENT ROUTING ALGORITHM

(75) Inventors: Mansoor Ali Khan Alicherry, Scotch Plains, NJ (US); Sadanand M. Gogate, Monmouth Junction, NJ (US); Harsha S. Nagesh, New Providence, NJ (US); Chitra A. Phadke, Basking Ridge, NJ (US); Viswanath Poosala, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 2139 days.

This patent is subject to a terminal disclaimer.

(21) Appl. No.: 10/426,501

(22) Filed: Apr. 30, 2003

(65) Prior Publication Data

US 2004/0221060 A1 Nov. 4, 2004

(51) Int. Cl.
*G06F 17/10* (2006.01)
*G06F 7/60* (2006.01)

(52) U.S. Cl. .......................................................... 703/2
(58) Field of Classification Search ................. 703/2, 21
See application file for complete search history.

(56) References Cited

OTHER PUBLICATIONS

Alanyali, M. and Ayanoglu, E. 1999. Provisioning algorithms for WDM optical networks. IEEE/ACM Trans. Netw. 7, 5 (Oct. 1999), 767-778.*
U.S. Appl. No. 10/426,500, filed Apr. 30, 2003, M.A.K. Alicherry et al., "Network Design Utilizing Integrated Planning and Configuration".
Y. Mansour et al., "An Approximation Algorithm for Minimum-Cost Network Design," DIMACS Workshop on Robust Communication Networks, pp. 1-7, 1998.
R.D. Davis et al., "Spider: A Simple and Flexible Tool for Design and Provisioning of Protected Lightpaths in Optical Networks," Bell Labs Technical Journal, pp. 82-97, Jan.-Jun. 2001.
J.W. Suurballe, "Disjoint Paths in a Network," Networks, vol. 4, pp. 125-145, Jun. 1974.
M. Alicherry et al., "Designing Operational WDM Networks," Bell Labs Technical Report, pp. 1-5, 2002.

* cited by examiner

*Primary Examiner* — Paul Rodriguez
*Assistant Examiner* — Luke Osborne
(74) *Attorney, Agent, or Firm* — Ryan, Mason & Lewis, LLP

(57) ABSTRACT

Techniques for designing networks. The techniques utilize network management-based routing (NMS routing) in conjunction with the planning step (design-based routing) of the design process so that an optimal network may be designed. An automated technique for designing a network may comprise the following steps. First, one or more traffic demands are obtained. Then, a network is computed by determining one or more routes for the one or more traffic demands using a design-based routing methodology based on feedback from a network management-based routing methodology.

17 Claims, 4 Drawing Sheets

NETWORK DESIGN UTILIZING NETWORK MANAGEMENT ROUTING ALGORITHM

CROSS REFERENCE TO RELATED APPLICATION

This application relates to the U.S. patent application identified as Ser. No. 10/426,500, entitled "Network Design Utilizing Integrated Planning and Configuration," filed concurrently herewith and commonly assigned, the disclosure of which is incorporated by reference herein.

FIELD OF THE INVENTION

The present invention relates to techniques for designing networks and, more particularly, to network design-techniques utilizing a network management routing algorithm.

BACKGROUND OF THE INVENTION

Network design tools are offline tools used to plan and deploy networks, such as optical networks. A central goal of any network design tool is to come up with an optimal network that can carry the given set of traffic demands. The design process involves routing the demands subject to one of several optimization metrics, such as the dollar cost of the network or the path lengths of the demands. The resulting design is used in multiple ways. Equipment vendors use the design in responding to requests for proposal (RFP). Carriers use the design to deploy their network and conduct what-if analyses.

In the latter case, once the network has been deployed according to the design, an online system known as a network management system (NMS) is responsible for routing the demands as they arrive in time. Typically, point-and-click software is used to automate this process over mesh networks. The NMS software is typically responsible for computing the optimal routes for the demands and signaling the cross connects to correctly set up the lightpaths. One example of NMS software is a product called WaveStar™ SNMS available from Lucent Technologies, Inc. (Murray Hill, N.J.).

Clearly, it is expected that the design network is operationally effective, i.e., is able to successfully carry the traffic for which it was designed. While this may seem like a foregone conclusion, there are certain disparities or mismatches between the design phase (offline route planning) and operation phase (online NMS-based routing) that make this difficult to achieve in practice.

First, the optimization criteria used to route demands during the two phases are often unrelated. For example, the design algorithm may be routing to minimize costs, while the NMS may be routing to minimize network congestion. As a result, the design algorithm may allocate capacity for a demand on certain links, whereas the NMS is trying to route the demand on different links. In some cases, this may result in not being able to route a demand.

Second, the order in which the demands arrive may be different from the order assumed during design algorithms. Since routing typically depends on the current usage of the network (e.g., in congestion-based routing), the computed paths may once again be different in design and operations, adding to the above problem. Clearly, failure to route a demand when there is stranded capacity in the network can be catastrophic to the bottom line of a network carrier. The solution adopted in practice is to force the NMS to route the demands along the paths computed by the design algorithm. However, this is not satisfactory since it ignores any operational criteria in routing.

SUMMARY OF THE INVENTION

The present invention provides automated techniques for designing networks. The techniques utilize network management-based routing (NMS routing) in conjunction with the planning step (design-based routing) of the design process so that an optimal network may be designed.

In one aspect of the invention, an automated technique for designing a network comprises the following steps. First, one or more traffic demands are obtained. Then, a network is computed by determining one or more routes for the one or more traffic demands using a design-based routing methodology based on feedback from a network management-based routing methodology.

The network computing step may comprise the following steps. First, the one or more traffic demands may be routed using the design-based routing methodology to determine an initially-designed network topology. Then, the one or more traffic demands may be routed on the initially-designed network topology using the network management-based routing methodology to determine whether there is an unroutable traffic demand. When there is an unroutable traffic demand, at least that demand may be rerouted using the design-based routing methodology to determine a revised network topology. The network management-based routing methodology may then be run again on the revised network. The network design technique may be performed iteratively until all unroutable traffic demands are rerouted. The process yields a designed network.

Advantageously, by executing a design-based routing methodology (or algorithm) in accordance with feedback from a network management-based routing methodology (or algorithm), the techniques of the invention provide an optimal network design that is able to account for potentially disparate optimization metrics that may be employed by the two algorithms.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
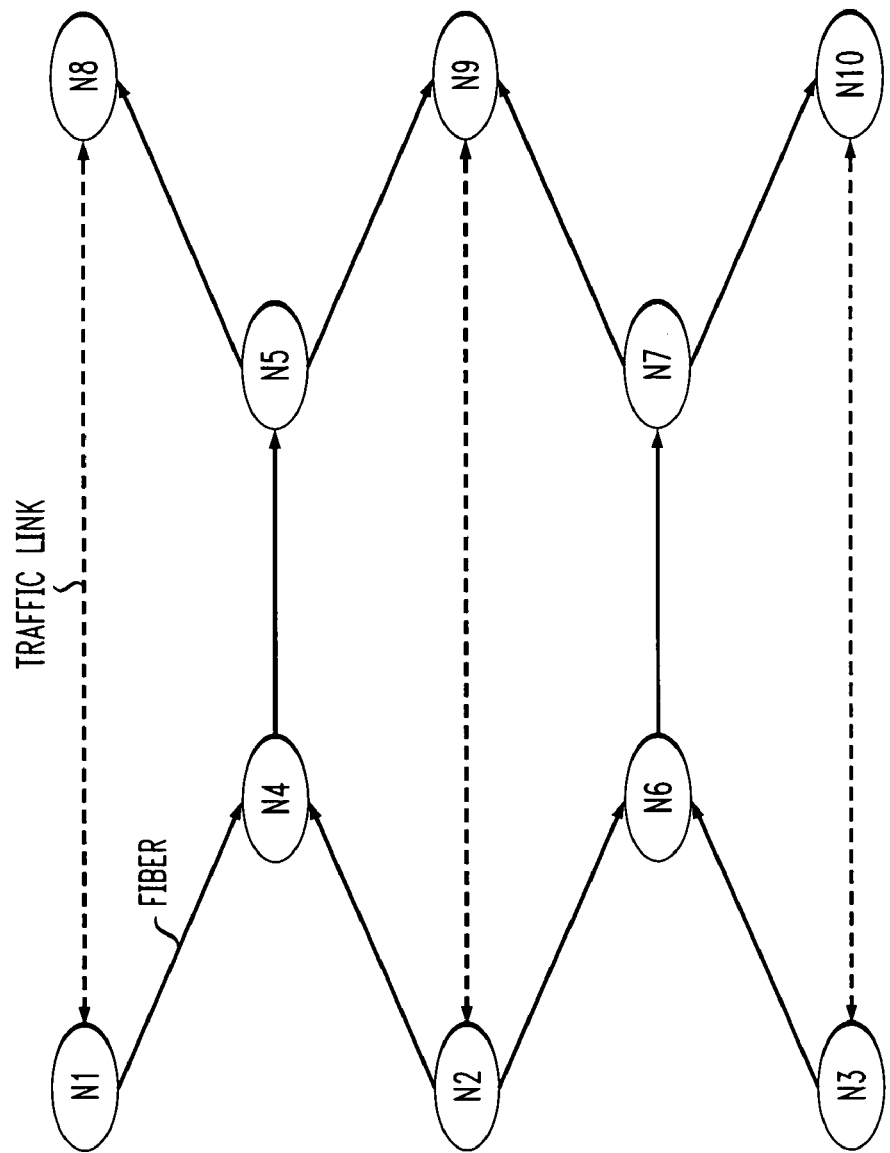
FIG. 1 is a diagram illustrating an example of an optical network.

The following description will illustrate the invention in the context of an exemplary optical network. It should be understood, however, that the invention is not necessarily limited to use with any particular type of network. The invention is instead more generally applicable to any environment in which it is desirable to design an optimal network. Thus, by way of example only, the techniques of the invention may also be applied to wireless networks, Internet Protocol (IP) networks, etc. It is to be appreciated that the term "cost," as used herein, is not intended to be limited only to monetary cost, but rather the term is intended to refer more generally to the expenditure of something for the attainment of a goal.

In order to eliminate the above-described mismatch of the routing algorithms used in planning (offline phase) and in NMS (online phase), the present invention provides a new planning and design algorithm which utilizes an NMS routing algorithm in a feedback loop and designs a robust network.

In accordance with illustrative principles of the invention, a network may be designed using a routing algorithm that minimizes the dollar cost of the network. Demands may then be routed on this network in a way that the NMS would route the demands in an online fashion. Typically, a few of these demands would fail to be routed due to lack of sufficient network capacity. Additional capacity may be added, in a cost optimal way, to the original designed network, for the demands which failed to be routed. All demands may then be routed again on this newly designed network. This iteration may be continued until all demands are successfully routed by the NMS routing algorithm on a network designed by the planning algorithm.

Integration of an NMS routing algorithm and a routing algorithm used to design networks results in a robust optical network which minimizes routing failure due to lack of capacity. The concept of having a feedback between NMS routing and planning routing algorithms can be applied to any planning routing algorithm and any NMS routing algorithm combination. The concept of linking these algorithms together during the design process provides a significant improvement in the design process.

The following portion of the detailed description formulates the generic network design problem and then presents a set of design and NMS algorithms. Let NW be a network topology comprising a set of locations (nodes) and rights-of-way (links). The nodes can contain cross connect elements, whereas the links can contain fiber and transmission equipment. Let T be an ordered-set of point-to-point traffic demands between the nodes. Each traffic demand, t∈T, requires certain OC-n bandwidth and can be unprotected or 1+1 protected. An unprotected traffic demand is susceptible to a single network failure. However, a traffic with 1+1 protection can handle a single network failure using a backup path. Let $\epsilon$ be a set of equipment available, containing cross connects and transmission system elements. A design problem instance can be defined to be the tuple (NW, T), where NW may already contain some equipment and traffic.

Then, the generic network design problem can be stated as follows: Given a design problem instance (NW, T), place the equipment while minimizing some optimization metric such that all the given traffic T can be successfully carried using the designed network.

The optimization metric is typically the dollar cost of the network, in which case, the metric leads to the cheapest network. However, it is also possible to be some other metric, such as the path lengths of the demands. In the latter case, the demands will be routed on their shortest paths over the given rights-of-way.

The routing problem arising in the NMS phase, as well as in the design phase, can be stated as follows: Given a network NW possibly carrying some traffic, and a new traffic demand t, compute a path from its source to destination and also any backup paths as required, subject to some optimization metric.

It is assumed that if there is at least one path between the source and destination with sufficient capacity, the routing algorithm will always find a path for the demand. Once again, the metric dictates how the paths are computed. It is simplest to route the demands along the shortest paths. Consider a common alternative which tries to minimize the congestion in the network. Congestion is a measure of the maximum link-utilization in the network. The idea behind this criterion is to: (a) reduce the chance of failure to compute a path in the future due to insufficient capacity; and (b) minimize the number of simultaneous demands failing in case of a single link failure.

Next, a set of design algorithms that may be employed in accordance with the invention are presented. The basic outline of the design algorithms is as follows:

Step 1 (Routing): Compute paths for each demand. This may either be a direct operation involving routing each demand or it may involve an optimization algorithm (e.g., linear program formulation) that results in routes for the demands.

Step 2 (Configuration): For each node and link, select the least-cost equipment that can support the traffic going through it.

It is to be appreciated that the present invention is not limited to use with any particular design algorithm or network management algorithm. Nonetheless, three examples of design algorithms that may be employed are described below.

Minimum Distance (MinDist): In this approach, demands are routed along their shortest paths. This simple approach is quite useful in practice because many carriers feel comfortable with such intuitive routes for demands. The shortest paths are computed using Dijkstra's algorithm, see, e.g., T. Cormen et al, "Introduction to Algorithms," MIT Press, 1990. To route 1+1 protected demands, one has to find two node-disjoint paths from source to destination. This problem is equivalent to finding a minimum cost 2-flow in a unit capacity network and the solution involves applying Dijkstra's algorithm twice on a transformed network, see, e.g., J. W. Suurbaale, "Disjoint Paths in a Network," Networks, vol. 4, June 1974.

Minimum Cost (MinCost): This algorithm attempts to minimize the dollar cost of the network. An example of such an algorithm is described in R. D. Davis et al., "Spider: A Simple and Flexible Tool for Design and Provisioning of Protected Lightpaths in Optical Networks," Bell Labs Technical Journal, January-June 2001, the disclosure of which is incorporated by reference herein. First, the demands are ordered in some random manner and each demand is routed on the cheapest path. The cheapest path is computed using Dijkstra's shortest path algorithm as above, but with the weights on the links being the dollar costs of the links if they were to carry the demand. Next, each demand is unrouted, freeing up resources allocated for that demand, and is rerouted. This process is repeated as long as the dollar cost of the overall network keeps decreasing.

Spanner: This algorithm only supports unprotected traffic, but gives a guarantee on the optimality of the solution. A k-spanner is defined as the subgraph of the original graph G in which the maximum length of a shortest path is within k-times the maximum length of a shortest path in G, see, e.g., Y. Mansour et al., "An Approximation Algorithm for Minimum-Cost Network Design," DIMACS Workshop on Robust Communication Networks, 1998. The Spanner algorithm, finds a log(n) spanner, of the network, where n is the nodes in the graph. The algorithm then applies MinDist to route the demands in the spanner, see, e.g., M. Alicherry et al., "Designing Deployable Optical Networks," Bell Labs Technical Report, 2002, the disclosure of which is incorporated by reference herein. The idea is that the spanner is much sparser than the original graph, leading to a faster solution. An approximate log(n) spanner is computed using a greedy approach, which is an extension of Kruskal's algorithm (see T. Cormen et al., "Introduction to Algorithms," MIT Press, 1990) for finding the minimal spanning tree. It has been shown that the resulting network is within log(n) factor of the optimal network that can be designed for the given set of demands.

It is also known to use other metrics or a combination of the metrics in practice.

The following portion of the detailed description identifies the operational problems arising in managing a designed network in the presence of mismatches between the routing algorithms arising in design and NMS. It is easy to see that if the two routing algorithms use different criteria for routing, they can lead to different paths for the same demand. For example, the congestion-based approach tries to route the demands over paths that are relatively unused. In contrast, the cost-based approach tries to reuse the same links because of the high startup costs of laying a new transmission system. In certain cases, this will actually lead to insufficient capacity to route a demand, as shown in the following example.

Referring initially to FIG. 1, an example of an optical network is illustrated. Assume that the demand set comprise three OC-192 demands $t_{1,8}$, $t_{2,9}$, and $t_{3,10}$ between the node pairs in the subscripts. In a MinCost design, the first demand will take N1-N4-N5-N8. The second will take N2-N4-N5-N9 because it is cheaper than laying a new transmission system in the alternative path. Finally, the third demand takes N3-N6-N7-N10. Now consider congestion-based NMS routing. The first demand will still take the same path, however, the second demand will now take N2-N6-N7-N9 to spread out the load. Since capacity sufficient for only one demand was provisioned over N6-N7, the third demand can not be routed anymore.

The probability of failure to route depends on the correlation between the two routing criteria. If the criteria are the same, all demands can be routed over the designed network under the assumption that the demands arrive in the same order. On the other hand, if they optimize contradictory features (e.g., congestion versus cost), there is a much higher chance of failure. Of course, there can be a wide range of unquantifiable correlations between two arbitrary routing criteria.

Accordingly, a central problem addressed by the present invention can now be formulated as follows: Consider a network design problem (NW, T) solved using a design algorithm D. Let the routing algorithm used in the NMS be R which is different from the routing algorithm in D. Then, modify the designed network such that all the traffic demands in T can be successfully routed using R (in the order they are given in T).

The following portion of the detailed description provides an illustrative system and methodology that are capable of producing operationally viable designs for any combinations of design and NMS routing algorithms.

Figure 2:
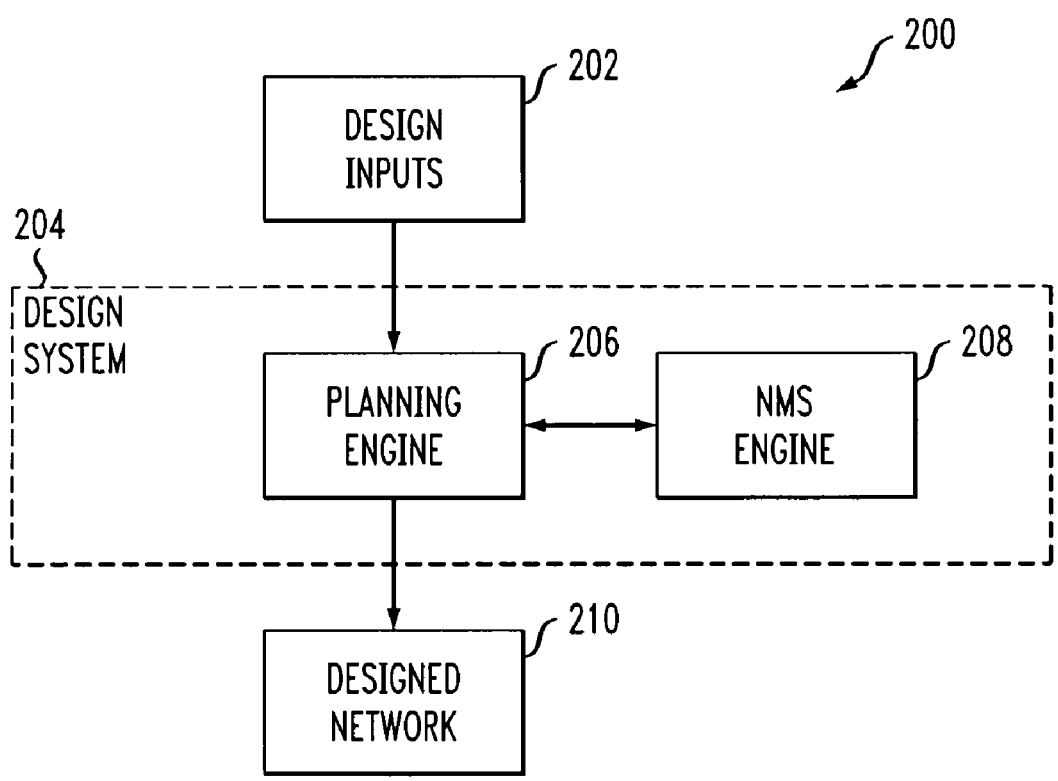
FIG. 2 is a block diagram illustrating an automated design system, according to an embodiment of the present invention.

Referring now to FIG. 2, a block diagram illustrates an automated design system, according to an embodiment of the present invention. As shown, design inputs 202 are provided by a user to design system 204 which, itself, comprises a planning engine 206 and a network management system (NMS) engine 208. The inputs to the design system may comprise a set of nodes and a set of links or right-of-ways (the nodes and links representing an initial topology), as well as a set of traffic demands.

Design system 204 then computes a network 210 by determining one or more routes for the traffic demands using a design-based routing algorithm executed by the planning engine 206 based on feedback from a network management-based routing algorithm executed by the NMS engine 208. Thus, as will be further explained below, the planning engine 206 and the NMS engine 208 integrally operate in a feedback arrangement so as to yield a designed network that substantially satisfies optimization goals associated with both the network design phase (e.g., minimize cost, path length) and the NMS routing phase (e.g., minimize congestion).

Figure 3:
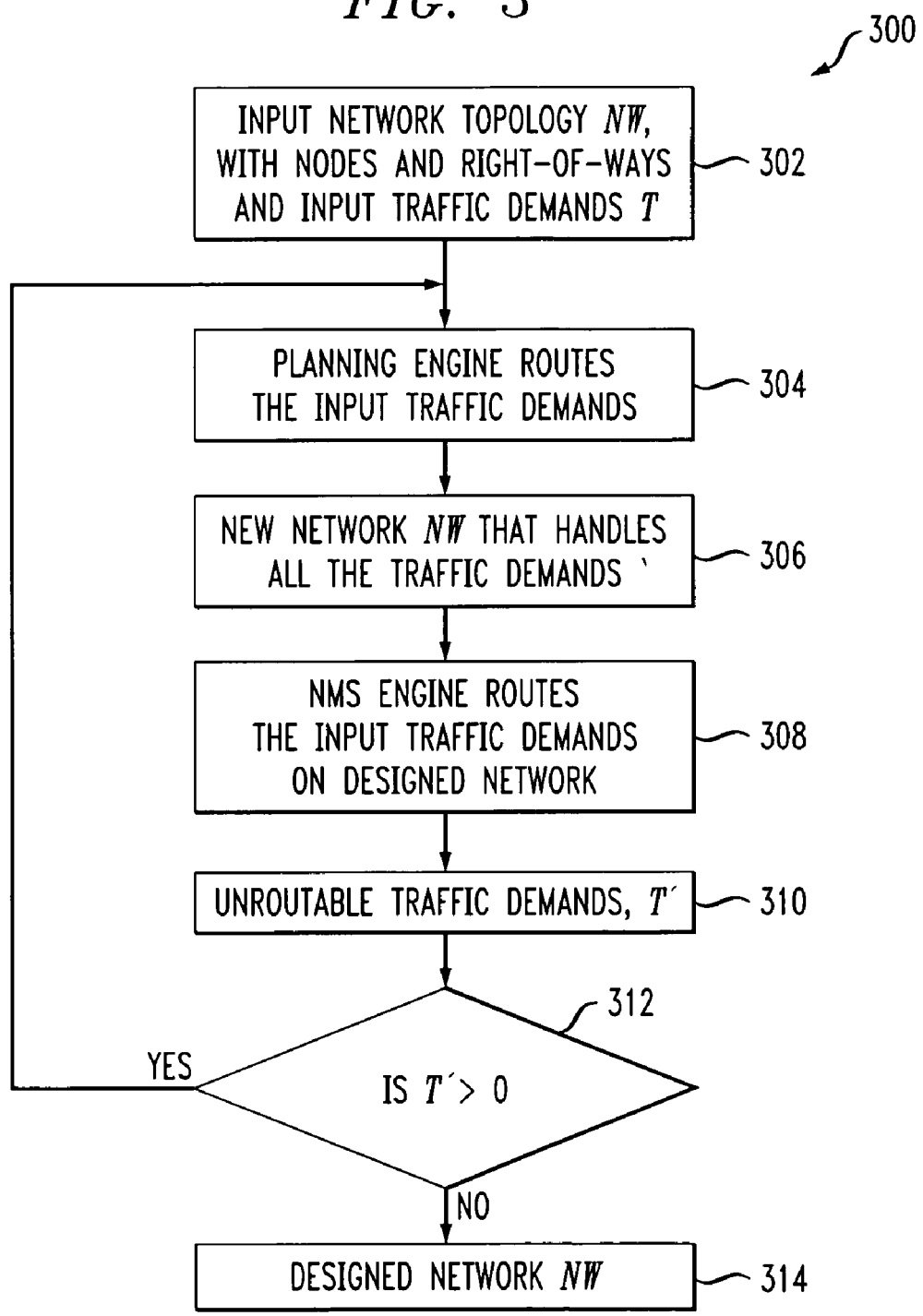
FIG. 3 is a flow diagram illustrating an automated design methodology, according to an embodiment of the present invention.

Referring now to FIG. 3, a flow diagram illustrates an automated design methodology, according to an embodiment of the present invention. It is to be appreciated that methodology 300 shown in FIG. 3 may be implemented, for example, by planning engine 206 and NMS engine 208 of design system 204 of FIG. 2.

In step 302, a user inputs an input network topology NW including nodes and right-of-ways. Traffic demands T are also inputted. In step 304, a network is initially designed using a chosen design algorithm D. This is accomplished by the planning engine 206 executing the chosen design-based routing algorithm. It is to be appreciated that the design algorithm may be one of the design algorithms described above (MinDist, MinCost, Spanner). However, other design algorithms may be employed since the invention is not limited to any particular design algorithm. The result is a new network NW (initially-designed network) that handles the input traffic demands (block 306).

In step 308, all of the demands in the input traffic set T are then routed on this network using a chosen NMS routing algorithm R. This is accomplished by the NMS engine 208 executing the chosen NMS routing algorithm R. It is to be appreciated that the NMS routing algorithm utilized may be any known NMS-based algorithm. Examples of such algorithms include, but are not limited to, MinDist (as explained above) and minimum congestion-based algorithms. Such minimum congestion-based algorithms typically use the Dijkstra's shortest path algorithm (see T. Cormen et al., "Introduction to Algorithms," MIT Press, 1990) where the weights used on the links to calculate the shortest path represent a measure of congestion on the link. Hence, the path discovered is the one with the minimum congestion. Also, the NMS routing algorithm utilized could be one of the routing algorithms available in the product referred to as WaveStar™ SNMS available from Lucent Technologies, Inc. (Murray Hill, N.J.). However, it is to be understood that other NMS routing algorithms may be employed since the invention is not limited to any particular network management-based routing algorithm.

If any demands fail to be routed, denoted as unroutable demands T' in block 310, the network design algorithm is reinvoked (step 304), starting with the network designed so far as the initial network and the failed demands as the new set of demands to be satisfied. Next, all of the demands in T are again routed on the newly designed network (revised network) using R. This iterative process continues until all demands can be successfully routed (step 312 determining if T'>0). The resulting network is outputted, as denoted by block 314. Specification of the resulting network may take any one of a variety of forms known to those skilled in the art.

It can be verified that the resulting network can indeed carry all of the traffic in T in the same order because of the loop termination condition. Note that the cost of the network increases with each iteration because new equipment gets added to carry the unroutable traffic. However, the size of the failed traffic set may not monotonically decrease from one iteration to the next. This is because the NMS may use the added capacity to route already routable demands and leave no path for the demands in the failed set. Despite this, it can be shown that methodology 300 is guaranteed to terminate in at most n iterations, where n is the number of traffic demands in T. In practice, however, the number of iterations required may be much smaller than n.

The methodology of FIG. 3 may be made even more efficient such that the traffic set is guaranteed to shrink with each iteration. In such an embodiment, at the end of each design, only the demands that were considered in that design are routed using the NMS algorithm R (i.e., the failed demand set and not all of T). This methodology is also expected to terminate in n iterations. However, in the resulting network, the demands in T are guaranteed to be routable if they arrive in the order they were successfully routed by the NMS in the design methodology of the invention. This may be different from the original order in T.

Figure 4:
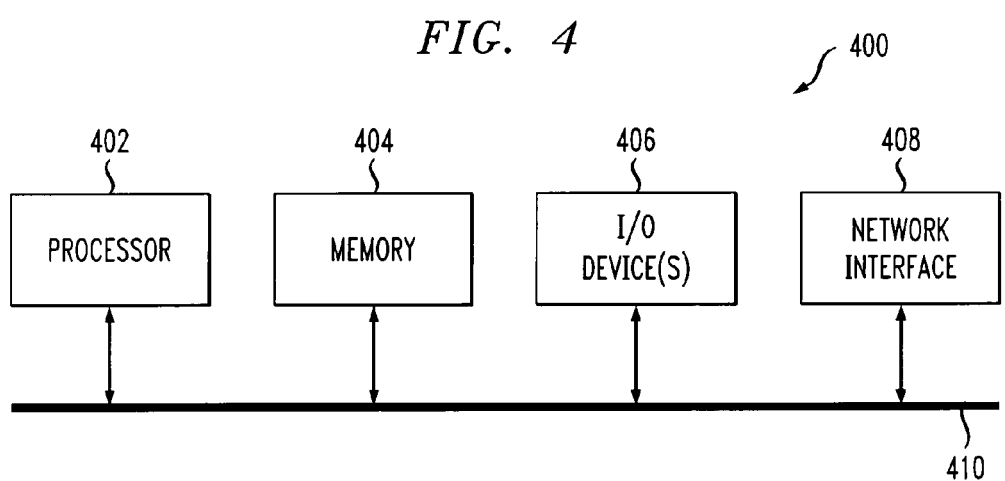
FIG. 4 is a block diagram illustrating a generalized hardware architecture of a computer system suitable for implementing an automated design system, according to an embodiment of the present invention.

Referring now to FIG. 4, a block diagram illustrates a generalized hardware architecture of a computer system suitable for implementing an automated design system, according to an embodiment of the present invention. More particularly, all or parts of design system 204 of FIG. 2 (namely, planning engine 206 and NMS engine 208) may implement such a computing system 400 to perform the techniques of the invention. Of course, it is to be understood that the invention is not limited to any particular computing system implementation.

In this illustrative implementation, a processor 402 for implementing at least a portion of the methodologies of the invention is operatively coupled to a memory 404, input/output (I/O) device(s) 406 and a network interface 408 via a bus 410, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs (e.g., 202 in FIG. 2) used by a design system (e.g., 204 in FIG. 2) to generate a designed network (e.g., 210 in FIG. 2). Alternatively, the design inputs could be read into the design system from a diskette or from some other source (e.g., another computer system) connected to the computer bus 410. The output devices may be one mechanism for a user to be presented with a specification of the designed network. The I/O devices are also a mechanism for a design system user to interact with the routing algorithms, if the need or desire arises.

Still further, the phrase "network interface" as used herein is intended to include, for example, one or more devices capable of allowing the computing system 400 to communicate with network equipment. Thus, the network interface may comprise a transceiver configured to communicate with a transceiver of piece of network equipment via a suitable communications protocol. It is to be understood that since the communications protocols employed may be specific to the types of network equipment, the invention is not limited to any particular communications protocol. It is further to be appreciated that the design system of the invention may communicate with network equipment via the network interface when also implementing the design methodologies described in the U.S. patent application identified as Ser. No. 10/426,500, entitled "Network Design Utilizing Integrated Planning and Configuration," filed concurrently herewith and commonly assigned, the disclosure of which is incorporated by reference herein.

It is to be appreciated that while the present invention has been described herein in the context of an automated design system, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. An automated method of designing a network, the method comprising the steps of:

obtaining one or more traffic demands;

computing a network, the network being computed by determining one or more routes for the one or more traffic demands using a design-based routing methodology based on feedback from a network management-based routing methodology; and outputting the computed network as a designed network such that the designed network is implementable to process traffic.

2. The method of claim 1, wherein the network computing step further comprises the steps of:

routing the one or more traffic demands using the design-based routing methodology to determine an initially-designed network topology;

routing the one or more traffic demands on the initially-designed network topology using the network management-based routing methodology to determine whether there is an unroutable traffic demand; and when an unroutable traffic demand has been determined, rerouting at least the unroutable traffic demand using the design-based routing methodology to determine a revised network topology.

3. The method of claim 2, wherein the rerouting step further comprises rerouting all of the obtained traffic demands.

4. The method of claim 2, further comprising the step of rerouting the one or more traffic demands on the revised network topology using the network management-based routing methodology.

5. The method of claim 1, wherein the number of times the design-based routing methodology and the network management-based routing methodology are used to route demands is equivalent to the number of traffic demands.

6. The method of claim 1, wherein the design-based routing methodology routes the one or more traffic demands based on one of cost and path length.

7. The method of claim 1, wherein the network management-based routing methodology routes the one or more traffic demands based on capacity.

8. The method of claim 1, wherein the network being designed is an optical network.

9. Apparatus for designing a network, the apparatus comprising:

a memory; and at least one processor coupled to the memory and operative to: (i) obtain one or more traffic demands; (ii) compute a network, the network being computed by determining one or more routes for the one or more traffic demands using a design-based routing methodology based on feedback from a network management-based routing methodology; and (iii) output the computed network as a designed network such that the designed network is implementable to process traffic.

10. The apparatus of claim 9, wherein the network computing operation further comprises: (i) routing the one or more traffic demands using the design-based routing methodology to determine an initially-designed network topology; (ii) routing the one or more traffic demands on the initially-designed network topology using the network management-based routing methodology to determine whether there is an unroutable traffic demand; and (iii) when an unroutable traffic demand has been determined, rerouting at least the unroutable traffic demand using the design-based routing methodology to determine a revised network topology.

11. The apparatus of claim 10, wherein the rerouting operation further comprises rerouting all of the obtained traffic demands.

12. The apparatus of claim 10, wherein the at least one processor is further operative to reroute the one or more traffic demands on the revised network topology using the network management-based routing methodology.

13. The apparatus of claim 9, wherein the number of times the design-based routing methodology and the network management-based routing methodology are used to route demands is equivalent to the number of traffic demands.

14. The apparatus of claim 9, wherein the design-based routing methodology routes the one or more traffic demands based on one of cost and path length.

15. The apparatus of claim 9, wherein the network management-based routing methodology routes the one or more traffic demands based on capacity.

16. The apparatus of claim 9, wherein the network being designed is an optical network.

17. Apparatus for designing a network, the apparatus comprising:

at least one computing system comprising a processor coupled to a memory, the at least one computing system being operative to implement:

a planning engine; and a network management engine, the network management engine being coupled to the planning engine;

wherein the planning engine obtains one or more traffic demands and a network is computed by determining one or more routes for the one or more traffic demands using a design-based routing methodology executed by the planning engine based on feedback from a network management-based routing methodology executed by the network management engine; further wherein the computed network is outputted as a designed network such that the designed network is implementable to process traffic.

\* \* \* \* \*